United States Patent
Itahashi et al.

(10) Patent No.: US 11,236,190 B2
(45) Date of Patent: Feb. 1, 2022

(54) NOVOLAC RESINS AND USE IN RUBBER COMPOSITIONS

(71) Applicants: SUMITOMO CHEMICAL ADVANCED TECHNOLOGIES LLC, Phoenix, AZ (US); SUMITOMO CHEMICAL COMPANY, LIMITED, Tokyo (JP)

(72) Inventors: Tamon Itahashi, Phoenix, AZ (US); David P. McNaughton, Phoenix, AZ (US); Koichiro Tajima, Phoenix, AZ (US); Michael C. Walkup, Phoenix, AZ (US)

(73) Assignee: SUMITOMO CHEMICAL COMPANY, LIMITED, Tokyo (JP)

(*) Notice: Subject to any disclaimer, the term of this patent is extended or adjusted under 35 U.S.C. 154(b) by 154 days.

(21) Appl. No.: 16/489,197

(22) PCT Filed: Feb. 28, 2018

(86) PCT No.: PCT/US2018/020302
§ 371 (c)(1),
(2) Date: Aug. 27, 2019

(87) PCT Pub. No.: WO2018/160750
PCT Pub. Date: Sep. 7, 2018

(65) Prior Publication Data
US 2020/0062884 A1    Feb. 27, 2020

Related U.S. Application Data

(60) Provisional application No. 62/464,894, filed on Feb. 28, 2017.

(51) Int. Cl.
| | | |
|---|---|---|
| C08G 8/22 | (2006.01) | |
| C08J 7/12 | (2006.01) | |
| C08K 5/3492 | (2006.01) | |
| C08L 7/00 | (2006.01) | |
| C08L 9/06 | (2006.01) | |

(52) U.S. Cl.
CPC ............ *C08G 8/22* (2013.01); *C08J 7/12* (2013.01); *C08K 5/34922* (2013.01); *C08L 7/00* (2013.01); *C08L 9/06* (2013.01); *C08L 2205/04* (2013.01)

(58) Field of Classification Search
CPC .................................. C08G 8/20; C08G 8/22
See application file for complete search history.

(56) References Cited

U.S. PATENT DOCUMENTS

| | | | |
|---|---|---|---|
| 4,889,891 A * | 12/1989 | Durairaj | C08G 16/02 525/139 |
| 5,021,522 A | 6/1991 | Durairaj et al. | |
| 5,049,641 A | 9/1991 | Hood et al. | |
| 5,936,056 A * | 8/1999 | Durairaj | C08L 61/14 528/96 |
| 7,074,861 B2 * | 7/2006 | Durairaj | C08G 8/22 525/137 |
| 7,772,345 B2 * | 8/2010 | Banach | C08G 8/28 526/347.1 |
| 2006/0069191 A1 * | 3/2006 | Durairaj | C08G 8/20 524/284 |

FOREIGN PATENT DOCUMENTS

CN   101235166 A   6/2008

OTHER PUBLICATIONS

Espacenet Translation of CN 101235166 (Year: 2021).*

\* cited by examiner

*Primary Examiner* — Michael M Dollinger
(74) *Attorney, Agent, or Firm* — Renner, Kenner, Greive, Bobak, Taylor & Weber

(57) ABSTRACT

A resorcinolic novolac resin composition comprising the reaction product of (i) an aldehyde or ketone, and (ii) aralkyl-substituted resorcinol and resorcinol, where the moles of the aralkyl-substituted resorcinol to the total moles of the resorcinol and aralkyl-substituted resorcinol is 0.01:1 to 0.4:1.

15 Claims, No Drawings

NOVOLAC RESINS AND USE IN RUBBER COMPOSITIONS

PRIORITY STATEMENT

This application claims the benefit of U.S. Provisional Application Ser. No. 62/464,894, filed on Feb. 28, 2017, which is incorporated herein by reference.

BACKGROUND OF THE INVENTION

Field of the Invention

The invention relates to aralkyl-substituted resorcinolic resin compositions and rubber compositions prepared using an aralkyl-substituted resorcinolic resin composition.

Brief Description of the Prior Art

Resorcinol resins, particularly novolac resins, include the reaction product of resorcinol and an aldehyde or ketone in the presence of excess resorcinol. Many useful resorcinol resins are formed from resorcinol and an aldehyde, and therefore reference is often made to resorcinol-aldehyde resins or resorcinol-aldehyde novolac resins.

Resorcinol resins are useful in the manufacture of rubber articles. Generally, resorcinol resins are used as bonding and stiffening agents in rubber formulations. As bonding agents, resorcinol resins advantageously promote adhesion of the rubber to various organic and inorganic constituents within a rubber composite. For example, many rubber composites are steel-reinforced or fabric-reinforced composites, and resorcinol resins are widely used to promote adhesion between the rubber and the steel or fabric cord.

Resorcinol resins are often produced with excess resorcinol; i.e. the resins generally have 10 to 20% unreacted or free resorcinol. The amount of free resorcinol can be a critical factor when balancing important properties. For example, if the amount of free resorcinol is reduced, which can be accomplished by increasing the relative amount of aldehyde, the softening point of the resin is increased which thereby creates difficulty when compounding with rubber at conventional compounding temperatures.

The presence of free resorcinol, however, can be problematic. For example, free resorcinol can volatilize during rubber mixing, such volatilization is often referred to as fuming, and thereby creates added issues to the rubber mixing process. Further, the presence of the free resorcinol contributes to the hygroscopicity of the resorcinol resin, which in turn creates storage and handling problems.

Efforts have been made to reduce the amount of free resorcinol within these resins by modifying or adding substituents to the resorcinol during the manufacture of the resin. This modification reduces the amount of free resorcinol available for fuming, but also reduces the number of reactive sites on the resorcinol molecule from three positions (2, 4, and 6) to two or less. The modified resorcinol resin is also less likely to absorb moisture. Thus, by modifying the resorcinol resin, resins having low fuming and low hygroscopicity have been produced. These modified resins, which are often referred to as styrenated resorcinolic resins, are conventionally produced by employing modified resins that are formed by reacting styrene with resorcinol at a molar ratio of about 0.4:1. For example, U.S. Pat. No. 5,049,641 teaches the synthesis of resorcinol resins using modified resorcinol that is formed by reacting styrene with resorcinol at a molar ratio of at least 0.25:1. Related thereto, U.S. Pat. No. 5,021,522 teaches improved vulcanizable rubber compositions prepared with aralkylated phenolic resins that are used as methylene acceptors. These methylene acceptors include at least 10 mole % aralkylation per phenolic group.

While these styrenated resins advantageously are low fuming and less hydroscopic than standard resins, they are characterized by brittleness, reduced reactivity, and result in higher hysteresis in the rubber compound. Brittleness, which is indicated by breakage of the resin particle, is problematic because broken resin particles create fine particles, also known as fines, which create dustiness at the rubber compounding application site and increase the likelihood of compaction of the resin during storage. The reduced reactivity of the resin, which is indicated by longer cure times, for example t'90, results in significantly lower throughput and less production capacity during use at the rubber compounding application site. The high hysteresis, which is indicated by increased tan delta of the rubber compound, is an indication of heat buildup during use of the finished rubber article and is disadvantageous in many rubber articles.

Accordingly, the tradeoffs between standard resins (i.e. those produced with unmodified resorcinol) and styrenated resins are well known, and the skilled person often chooses between the two based upon a number of factors. For example, standard resins remain commercially important, and the skilled person uses other means to address issues related fuming and hygroscopicity. In another example, in manufacturing locations where insufficient environmental controls exist or high humidity is a problem, the low reactivity of the styrenated resins are acceptable. There remains, nonetheless, a desire to continue to improve upon of resorcinol resins.

SUMMARY OF THE INVENTION

Aspects of the present invention provide a resorcinolic novolac resin composition comprising (i) a resin including units defined by the formula (I)

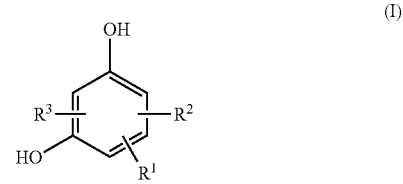

where R1 is a hydrogen atom or an aralkyl group, at least one of R2 and R3 is an alkylene bridge, and the other of R2 and R3 is an alkylene bridge or a hydrogen atom; and (ii) unreacted resorcinolic compounds defined by the formula (II)

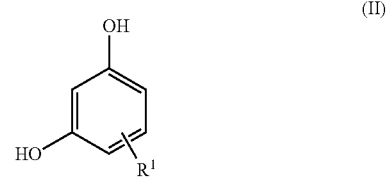

where R1 is a hydrogen atom or an aralkyl group, and where the composition includes greater than 1 mole and less than 40 moles of aralkyl groups per mole of units defined by the formula (I) plus moles of compounds defined by the formula (II).

Other aspects of the invention provide a resorcinolic novolac resin composition comprising the reaction product of (i) an aldehyde or ketone, and (ii) aralkyl-substituted resorcinol and resorcinol, where the moles of the aralkyl-substituted resorcinol to the total moles of the resorcinol and aralkyl-substituted resorcinol is 0.01:1 to 0.4:1.

Still other aspects of the invention provide a method for forming an aralkyl-substituted resorcinolic novolac resin composition, the method comprising of reacting (i) an aldehyde or ketone with (ii) an aralkyl-substituted resorcinol and resorcinol, where the moles of the aralkyl-substituted resorcinol to the total moles of the resorcinol and aralkyl-substituted resorcinol is 0.01:1 to 0.4:1.

DETAILED DESCRIPTION

Aspects of the invention are based, at least in part, on the discovery of an aralkyl-substituted resorcinolic novolac resin composition wherein 1 mole % to 40 mole % of the total resorcinolic aromatic rings have been aralkylated with one or more compounds selected from the group consisting of styrene, alpha-methyl styrene, beta-methyl styrene and p-methyl styrene. It has unexpectedly been discovered that at relatively low levels of aralkylation, the resins are characterized by advantageously lower brittleness as compared to both standard resins (i.e. those without aralkylation) and conventional styrenated resins. Thus, while the prior art teaches resins with significant levels of aralkylation in order to reduce free resorcinol, it has now unexpectedly been discovered that low levels of aralkylation provide benefits that are not observed at higher levels of aralkylation. Accordingly, aspects of the invention are directed toward modified resins and methods for making these resins with low levels of aralkylation. Furthermore, it has been observed that these modified resins provide rubber compositions, including cured rubber compositions, that demonstrate advantages over rubber compositions that include standard resorcinol resins and conventional styrenated resins. Thus, other embodiments are directed toward rubber compositions and vulcanizates that are prepared using modified resins as defined herein.

The aralkyl-substituted resorcinolic novolac resin compositions of the present invention may also be referred to as aralkyl-substituted resorcinolic resin compositions, aralkylated resorcinol resin compositions, or styrenated resorcinol resin compositions. These compositions include (i) resin that contains resorcinolic units and (ii) unreacted (i.e. unbound) resorcinolic compounds (i.e. resorcinolic monomer). The resorcinolic units within the resin include resorcinol units and aralkyl-substituted resorcinol units (or aralkylated resorcinol units). The skilled person appreciates that the units within the resin, particularly the resorcinolic units, derive from resorcinol or aralkyl-substituted resorcinol that has been reacted, such as by way of a condensation reaction, with an aldehyde or ketone. The unreacted resorcinolic compounds include both resorcinol and aralkyl-substituted resorcinol.

In one or more embodiments, the aralkyl-substituted resorcinolic resin includes one or more resorcinolic units defined by the Formula (I)

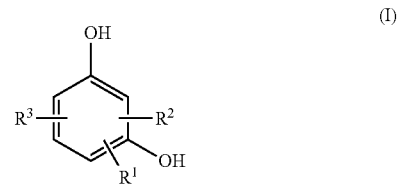

where $R^1$ is a hydrogen atom or an aralkyl group, at least one of $R^2$ and $R^3$ is an alkylene bridge, and the other of $R^2$ and $R^3$ is an alkylene bridge or a hydrogen atom. The structure employed in formula (I) is intended to represent the fact that the methylene bridge(s) can be bonded to the 2, 4, or 6 position on the aromatic ring. Also, the substituent $R^1$, especially where $R^1$ is an aralkyl group, may be located at the 2, 4, or 6 position. The skilled person will appreciate that any carbon atom within the aromatic ring that is not bonded to a hydroxyl group, $R^1$, $R^2$, or $R^3$ will include a hydrogen atom. In one or more embodiments, the resorcinolic compounds may be defined by the Formula (II)

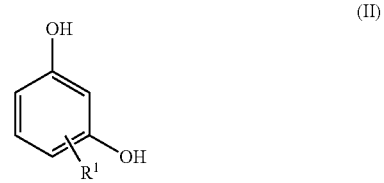

where $R^1$ is a hydrogen atom or an aralkyl group.

In one or more embodiments, the aralkyl group is the residue of reacting an aralkyldienyl compound with resorcinol. In particular embodiments, the aralkyldienyl compounds include styrene, alpha-methyl styrene, beta-methyl styrene, and p-methyl styrene. As the skilled person will appreciate, where styrene is reacted with resorcinol, a resorcinolic compound defined by Formula (III) may result:

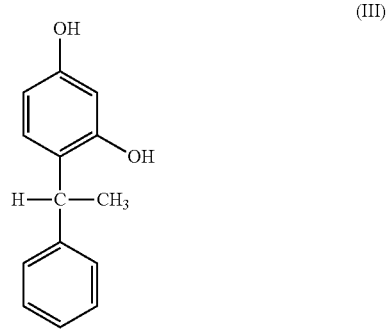 [SMILES: CC(c1ccccc1)c1ccc(O)cc1O]

where the aralkyl-substituent (i.e. —C(CH$_3$)(H)(C$_6$H$_5$)) may be referred to as a styryl substituent or styryl group. The skilled person appreciates that the styryl substituent or group is the residue of styrene following reaction with resorcinol. Accordingly, the resorcinolic compound of Formula (III) may be referred to as 4-styryl resorcinol or more generally as styryl resorcinol. In a similar fashion, where the aralkyl substituent instead derives from alpha-methyl styrene, beta-methyl styrene, or p-methyl styrene, the substituent may instead be referred to generically as a methyl styryl substituent or group, and the compound may be referred to as methyl styryl resorcinol. The skilled person appreciates that the styryl substituent (or the methyl styryl substituents) can also be bonded to the other locations on the resorcinol ring, such as the 2 or 6 position.

According to aspects of the present invention, the aralkyl-substituted resorcinolic resin compositions of the present invention include less than 40 moles, in other embodiments less than 14 moles, in other embodiments less than 13 moles, in other embodiments less than 10 moles, in other embodiments less than 9.5 moles, and in other embodiments less than 9.0 moles of aralkyl groups per (i) moles of resorcinolic units (e.g. defined by the Formula (I)) plus (ii) moles of resorcinolic compounds (e.g. compounds defined by the Formula (II)). In these or other embodiments, the aralkyl-substituted resorcinolic resin compositions of the present invention include greater than 1 mole, in other embodiments greater than 1.5 moles, in other embodiments greater than 2.0 moles, in other embodiments greater than 2.5 moles, in other embodiments greater than 3.5 moles, and in other embodiments greater than 4.0 moles of aralkyl groups per (i) moles of resorcinolic units (e.g. defined by the Formula (I)) plus (ii) moles of resorcinolic compounds (e.g. compounds defined by the Formula (II)). In one or more embodiments, the aralkyl-substituted resorcinolic resin compositions of the present invention include from about 1 mole to about 40, in other embodiments from about 1 moles to about 14 moles, in other embodiments from about 1 moles to about 13 moles, in other embodiments from about 1 mole to about 10 moles, in other embodiments from about 1 mole to about 9.0 moles, and in other embodiments from about 1 mole to about 9.5 moles of aralkyl groups per (i) moles of resorcinolic units (e.g. defined by the Formula (I)) plus (ii) moles of resorcinolic compounds (e.g. compounds defined by the Formula (II)).

The resorcinolic compounds employed in the present invention are prepared by reacting resorcinol with one or more compounds (i.e. aralkyldienyl compounds) selected from the group consisting of styrene, alpha-methyl styrene, beta-methyl styrene, and p-methyl styrene.

In one or more embodiments, the resorcinolic compounds are prepared by reacting an appropriate molar ratio of aralkyldienyl compound to resorcinol to provide a resultant composition that includes less than 40 mole %, in other embodiments less than 14 mole %, in other embodiments less than 13 mole %, in other embodiments less than 10 mole %, in other embodiments less than 9.5 mole %, and in other embodiments less than 9.0 mole % aralkyl groups relative to the total moles of resorcinolic compounds. In these or other embodiments, the resorcinolic compounds are prepared by reacting an appropriate molar ratio of aralkyldienyl compound to resorcinol to provide a resultant composition that includes greater than 1 mole %, in other embodiments greater than 1.5 mole %, in other embodiments greater than 2.0 mole %, in other embodiments greater than 2.5 mole %, in other embodiments greater than 3.0 mole %, and in other embodiments greater than 3.5 mole % aralkyl groups relative to the total moles of resorcinolic compounds. In these or other embodiments, the resultant composition includes from 1 mole % to 40 mole %, in other embodiments from 1 mole % to 14 mole %, in other embodiments from 1 mole % to 13 mole %, in other embodiments from 1 mole % to 10 mole %, in other embodiments from 1 mole % to 9.5 mole %, and in other embodiments from 1 mole % to 9.0 mole % aralkyl groups relative to the total moles of resorcinolic compounds.

The skilled person will appreciate that some resorcinolic aromatic rings within a particular novolac resin composition may contain multiple aralkyl groups while other resorcinolic aromatic rings may not include any aralkyl groups. This fact does not, however, alter the quantification of the aralkyl groups as represented by mole % since mole percent accounts for the number of aralkyl groups relative to the number of resorcinolic rings. In one or more embodiments, the desired degree of aralkylation can be achieved by blending, for example, resorcinol compositions that highly aralkylated with resorcinol compositions that are less (including zero) aralkylated.

The aralkylation reaction is carried out by reacting the resorcinol with the desired amount of one or more compounds selected from the group consisting of styrene, alpha-methyl styrene, beta-methyl styrene, and p-methyl styrene. This reaction can be carried out in the presence or absence of solvents. Sometimes solvents may be beneficial. Examples of suitable solvents include benzene, toluene, xylene, ethylbenzene, alkyl alcohols and acetone.

In order to be commercially feasible, the reaction of one or more compounds selected from the group consisting of styrene, alpha-methyl styrene, beta-methyl styrene, and p-methyl styrene with the resorcinol may need to be catalyzed. Examples of suitable catalysts are Friedel Crafts catalysts and acid catalysts. Examples of acid catalysts include inorganic acids such as hydrochloric, sulfuric, phosphoric, and phosphorous. Examples of organic acid catalysts include alkyl and aryl sulfonic acids such as benzene sulfonic acid, benzene disulfonic acid, toluene sulfonic acid, xylene sulfonic acid and methane sulfonic acid. Useful catalysts are aryl sulfonic acid catalysts. The amount of catalyst may be in the range of 0.01 to 10 parts catalyst per 100 parts resorcinol. The aralkylation reaction generally is carried out at temperatures between 50° C. and 180° C.

In one or more embodiments, the resin compositions of the present invention are generally prepared by reacting resorcinolic compounds with an aldehyde or ketone. The molar ratio of aldehyde or ketone to resorcinol may vary from about 0.50:1 to 1:1, in other embodiments from about 0.52:1 to about 0.68:1, in other embodiments from about 0.54:1 to about 0.66:1, in other embodiments from about 0.56:1 to 0.64:1, and in other embodiments from about 0.57:1 to about 0.62:1.

In one or more embodiments, the aldehyde or ketone may be selected from the group consisting of formaldehyde, methyl formcel, acetaldehyde, propionaldehyde, butyraldehyde, crotonaldehyde, cinnamaldehyde, benzaldehyde, furfural, acetone, and methyl ethyl ketone. In particular embodiments, the aldehyde or ketone is formaldehyde or methyl formcel.

As suggested above, the desired resin may be prepared by first reacting resorcinol with the aralkyldienyl compound and then reacting the resorcinolic compound with a ketone or aldehyde. It is also possible to simultaneously aralkylate the resorcinol while reacting the same with the aldehyde or ketone. In particular embodiments, the resorcinol is first aralkylated and then the aralkylated resorcinolic composition, which includes both aralkyl-substituted resorcinol and resorcinol (i.e. resorcinol that has not been reacted with an aralkyldienyl compound), is reacted with the aldehyde or ketone. In alternate embodiments, the resin may be aralkylated after the resorcinolic novolac resin has been prepared (i.e. after a reaction of resorcinol or aldehyde or ketone).

In those embodiments where the aralkylated resorcinolic composition is reacted with an aldehyde or ketone, the aralkylated resorcinolic composition provided to the reaction may be characterized by the ratio of moles of aralkyl-substituted resorcinol to the total moles of resorcinol and aralkyl-substituted resorcinol within the composition. In one or more embodiments, the moles of aralkyl-substituted resorcinol to the total moles of resorcinol and aralkyl-substituted resorcinol within the composition may be from 0.01:1 to 0.4:1, in other embodiments from 0.01:1 to 0.14:1, in other embodiments from 0.01:1 to 0.13:1, in other embodiments from 0.01:1 to 0.10:1, in other embodiments from 0.01:1 to 0.09:1, and in other embodiments from 0.01:1 to 0.095:1.

In one or more embodiments, the aralkyl-substituted resorcinolic novolac resin compositions of the present invention may include greater than 10 wt %, in other embodiments greater than 11 wt %, and in other embodiments greater than 12 wt % free resorcinol (i.e. unbound or resorcinol that is not reacted with aldehyde or ketone). In these or other embodiments, the aralkyl-substituted resorcinolic novolac resin compositions of the present invention may include less than 25 wt %, in other embodiments less than 23 wt %, and in other embodiments less than 20 wt % free resorcinol. In one or more embodiments, the aralkyl-substituted resorcinolic novolac resins may include from about 10 to about 25 wt %, in other embodiments from about 11 to about 23 wt %, and in other embodiments from about 12 to about 20 wt % free resorcinol. As the skilled person will appreciate, free resorcinol can be measured by liquid chromatography.

In one or more embodiments, the aralkyl-substituted resorcinolic novolac resin compositions of the present invention may be characterized by a softening point of from about 90 to about 120° C., and in other embodiments from about 95 to about 115° C. The softening point of the resins can be determined according to the following method with reference to the latest edition of ASTM E 28 and ASTM D 6090, which are incorporated by reference herein in their entirety. This method can employ a Mettler softening point apparatus, which may include a control unit Model FP-90 or equivalent, a furnace Model FP-83 or equivalent, and cartridge assemblies, a timer, porcelain evaporating dishes (about 3" in diameter), and a hot plate. The method may employ cups of pitch type drilled to 0.257" opening (F drill), and a 440 stainless steel ball (0.2500" in diameter and must pass through cups). The apparatus may be calibrated according to ASTM D 6090. A resin sample (~15 grams) can be melted in a porcelain or aluminum evaporating dish on the surface of a hot plate at 600-650° F., for approximately 4 minutes. After melting, the sample can be poured into cups that had been preheated to at least the temperature of the molten resin. The quantity of resin sample poured into the cups should be such that after solidification, the excess can be removed with a heated spatula or putty knife. The sample can then be cooled to room temperature in a desiccator, the cartridge can then be assembled so that the ball rests on the top of the resin. The assembled cartridge is then placed in the furnace, which can be preset to 85° C. or 10-15° C. below the expected softening point. The heating rate can be set at 1° C./min. The cartridge can then be turned until it is locked into position. After 30 seconds, the operation of softening point apparatus can be initiated, thereby yielding the completed softening point measurement.

The condensation reaction of the aralkylated resorcinolic composition (e.g. resorcinol-containing composition) with the aldehyde or ketone may be carried out in the absence of a catalyst or in the presence of a catalyst. Useful catalysts include conventional acid catalysts. Examples of suitable acid catalysts are set forth above. In one or more embodiments, the reaction may be carried out in the temperature range of 50° C. to 200° C. The use of solvents is optional and suitable solvents are the same as set forth earlier.

In one or more embodiments, the aralkyl-substituted resorcinolic novolac resins of this invention may be in the form of powder, flake, pastilles, or prills. In particular embodiments, the aralkyl-substituted resorcinolic novolac resins are in the form of pastilles or prills.

With regard to the rubber compositions of the present invention, the rubber compositions may include a rubber component that may include any natural rubber, synthetic rubber or combination thereof. Examples of synthetic rubber include but are not limited to styrene butadiene copolymer, polyisoprene, polybutadiene, acrylonitrile butadiene styrene, polychloroprene, polyisobutylene, ethylene-propylene copolymer and ethylene-propylene-diene rubber.

The rubber compositions may also include one or more of the normal additives used in such compositions. Examples of such additives include carbon black, cobalt salts, stearic acid, silica, silicic acid, sulfur, peroxides, zinc oxide, fillers, antioxidants and softening oils.

In one or more embodiments, the aralkyl-substituted resorcinolic novolac resin compositions of the present invention are often used for adhering rubber to reinforcing materials. The reinforcing materials optionally may be pre-reacted or coated with adhesives and the like. The present invention has applicability whether or not the reinforcing materials are pre-coated or pre-reacted with adhesive materials. Examples of suitable reinforcing materials include nylon, rayon, polyester, polyamide, fiberglass, steel, brass-coated steel, and galvanized steel.

The rubber composition may also include one or more of a methylene donor component. The methylene donor component is any compound that generates formaldehyde upon heating during the vulcanization. Examples of such compounds are set forth in U.S. Pat. No. 3,751,331. Which is incorporated herein by reference. Preferred methylene donor compounds are hexamethylenetetramine, di-methylol melamine, tri-methylol melamine, tetra-methylol melamine, penta-methylol melamine, hexa-methylol melamine, and mixtures thereof. The methylol melamines may be completely or partially etherified or esterified such as hexamethoxymethylol melamine. The methylene donor may be present in concentrations from about 0.1 to 15 parts per one hundred parts rubber or in other embodiments from 0.1 to 10 parts per one hundred parts rubber. The ratio of methylene donor to aralkyl-substituted resorcinolic novolac resin may be from 1:10 to 10:1.

As should be appreciated, the rubber component, additives, reinforcing materials and methylene donor compounds are known. In addition, the method of vulcanizing the compositions is known. The improvements of the present invention are related to aralkyl-substituted resorcinolic novolac resins.

The amount of aralkyl-substituted resorcinolic novolac resin composition in the rubber compound usually is from 0.5 to 10 parts by weight per 100 parts by weight of rubber. In other embodiments, the amount may be from 1 to 5 parts.

The rubber compositions are prepared and used in the conventional manner of preparing and using such compositions.

The rubber compositions produced according to the present invention may be used for various rubber applications or rubber goods. The uncured and cured rubber compositions of this invention may be used in tire applications or used to prepare portions of a tire, such as tire treads, belt skim stock, sidewalls, bead compounds, carcasses, or other areas of a tire. Other applications include rubber products that are useful for engine mounts and bushings. Still other examples of applications in which the uncured and cured rubber compositions of this invention may be used or used to prepare include technical or mechanical rubber goods such as hoses, pneumatic belts, and conveyor belts.

EXAMPLES

The following novolac resins were prepared and tested for various properties as identified in Tables 2-4 below.

Comparative Example 1. Resorcinolic Novolac Resin 230.0 g of resorcinol was charged to a flask and heated to 120° C.-135° C. 96.6 g of 37% formaldehyde solution was then charged to the reactor stream-wise over a period of 60 minutes, during which time the temperature dropped and reflux occurred. After all the formaldehyde was added, the mixture was held at reflux for 15 minutes. Water was removed by atmospheric distillation to 145° C. Vacuum was applied and distillation continued to 160° C. When a temperature of 160° C. was reached, the vacuum was released and the resin was discharged from the flask.

Example 1. Aralkyl-Substituted Resorcinolic Novolac Resin 230.0 g of resorcinol was charged to a flask and heated to 120° C.-135° C. 0.7 g of p-toluene sulfonic acid was then added and mixed for 10 minutes. 2.2 g of styrene was then charged to the flask stream-wise over a period of about 15 minutes while the temperature was maintained at 120° C.-135° C. After all of the styrene was charged, the temperature was increased to 150° C.-155° C. and was maintained at 150° C.-155° C. for 15 minutes. 97.0 g of 37% formaldehyde solution was then charged to the reactor stream-wise over a period of 60 minutes, during which time the temperature dropped and reflux occurred. After all the formaldehyde was added, the mixture was held at reflux for 15 minutes. Then, 0.3 g of a 50% solution of sodium hydroxide was added. Water was then removed by atmospheric distillation to 145° C. Vacuum was applied and distillation continued to 160° C. When a temperature of 160° C. was reached, the vacuum was released and the resin was discharged from the flask.

Example 2. Aralkyl-Substituted Resorcinolic Novolac Resin 230.0 g of resorcinol was charged to a flask and heated to 120° C.-135° C. 0.7 g of p-toluene sulfonic acid was then added and mixed for 10 minutes. 8.8 g of styrene was then charged to the flask stream-wise over a period of about 15 minutes while the temperature was maintained at 120° C.-135° C. After all of the styrene was charged, the temperature was increased to 150° C.-155° C. and was maintained at 150° C.-155° C. for 15 minutes. 96.6 g of 37% formaldehyde solution was then charged to the reactor stream-wise over a period of 60 minutes, during which time the temperature dropped and reflux occurred. After all the formaldehyde was added, the mixture was held at reflux for 15 minutes. Then, 0.3 g of a 50% solution of sodium hydroxide was added. Water was then removed by atmospheric distillation to 145° C. Vacuum was applied and distillation continued to 160° C. When a temperature of 160° C. was reached, the vacuum was released and the resin was discharged from the flask.

Example 3. Aralkyl-Substituted Resorcinolic Novolac Resin 230.0 g of resorcinol was charged to a flask and heated to 120° C.-135° C. 0.7 g of p-toluene sulfonic acid was then added and mixed for 10 minutes. 13.3 g of styrene was then charged to the flask stream-wise over a period of about 15 minutes while the temperature was maintained at 120° C.-135° C. After all of the styrene was charged, the temperature was increased to 150° C.-155° C. and was maintained at 150° C.-155° C. for 15 minutes. 96.6 g of 37% formaldehyde solution was then charged to the reactor stream-wise over a period of 60 minutes, during which time the temperature dropped and reflux occurred. After all the formaldehyde was added, the mixture was held at reflux for 15 minutes. Then, 0.3 g of a 50% solution of sodium hydroxide was added. Water was then removed by atmospheric distillation to 145° C. Vacuum was applied and distillation continued to 160° C. When a temperature of 160° C. was reached, the vacuum was released and the resin was discharged from the flask.

Example 4. Aralkyl-Substituted Resorcinolic Novolac Resin 230.0 g of resorcinol was charged to a flask and heated to 120° C.-135° C. 0.7 g of p-toluene sulfonic acid was then added and mixed for 10 minutes. 19.5 g of styrene was then charged to the flask stream-wise over a period of about 15 minutes while the temperature was maintained at 120° C.-135° C. After all of the styrene was charged, the temperature was increased to 150° C.-155° C. and was maintained at 150° C.-155° C. for 15 minutes. 96.6 g of 37% formaldehyde solution was then charged to the reactor stream-wise over a period of 60 minutes, during which time the temperature dropped and reflux occurred. After all the formaldehyde was added, the mixture was held at reflux for 15 minutes. Then, 0.3 g of a 50% solution of sodium hydroxide was added. Water was then removed by atmospheric distillation to 145° C. Vacuum was applied and distillation continued to 160° C. When a temperature of 160° C. was reached, the vacuum was released and the resin was discharged from the flask.

Example 5. Aralkyl-Substituted Resorcinolic Novolac Resin 230.0 g of resorcinol was charged to a flask and heated to 120° C.-135° C. 0.7 g of p-toluene sulfonic acid was then added and mixed for 10 minutes. 22.0 g of styrene was then charged to the flask stream-wise over a period of about 15 minutes while the temperature was maintained at 120° C.-135° C. After all of the styrene was charged, the temperature was increased to 150° C.-155° C. and was maintained at 150° C.-155° C. for 15 minutes. 96.6 g of 37% formaldehyde solution was then charged to the reactor stream-wise over a period of 60 minutes, during which time the temperature dropped and reflux occurred. After all the formaldehyde was added, the mixture was held at reflux for 15 minutes. Then, 0.3 g of a 50% solution of sodium hydroxide was added. Water was then removed by atmospheric distillation to 145° C. Vacuum was applied and distillation continued to 160° C. When a temperature of 160° C. was reached, the vacuum was released and the resin was discharged from the flask.

Example 6. Aralkyl-Substituted Resorcinolic Novolac Resin 230.0 g of resorcinol was charged to a flask and heated to 120° C.-135° C. 0.7 g of p-toluene sulfonic acid was then added and mixed for 10 minutes. 30.5 g of styrene was then charged to the flask stream-wise over a period of about 30 minutes while the temperature was maintained at 120° C.-135° C. After all of the styrene was charged, the temperature was increased to 150° C.-155° C. and was maintained at 150° C.-155° C. for 15 minutes. 96.6 g of 37% formaldehyde solution was then charged to the reactor stream-wise over a period of 60 minutes, during which time the temperature dropped and reflux occurred. After all the formaldehyde was added, the mixture was held at reflux for 15 minutes. Then, 0.3 g of a 50% solution of sodium hydroxide was added. Water was then removed by atmospheric distillation to 145° C. Vacuum was applied and distillation continued to 160° C. When a temperature of 160° C. was reached, the vacuum was released and the resin was discharged from the flask.

Example 7. Aralkyl-Substituted Resorcinolic Novolac Resin 230.0 g of resorcinol was charged to a flask and heated to 120° C.-135° C. 0.7 g of p-toluene sulfonic acid was then added and mixed for 10 minutes. 43.6 g of styrene was then charged to the flask stream-wise over a period of about 60 minutes while the temperature was maintained at 120° C.-135° C. After all of the styrene was charged, the temperature was increased to 150° C.-155° C. and was maintained at 150° C.-155° C. for 15 minutes. 96.6 g of 37% formaldehyde solution was then charged to the reactor stream-wise over a period of 60 minutes, during which time the temperature dropped and reflux occurred. After all the formaldehyde was added, the mixture was held at reflux for 15 minutes. Then, 0.3 g of a 50% solution of sodium hydroxide was added. Water was then removed by atmospheric distillation to 145° C. Vacuum was applied and distillation continued to 160° C. When a temperature of 160° C. was reached, the vacuum was released and the resin was discharged from the flask.

Example 8. Aralkyl-Substituted Resorcinolic Novolac Resin 230.0 g of resorcinol was charged to a flask and heated to 120° C.-135° C. 0.7 g of p-toluene sulfonic acid was then added and mixed for 10 minutes. 87.0 g of styrene was then charged to the flask stream-wise over a period of about 100 minutes while the temperature was maintained at 120° C.-135° C. After all of the styrene was charged, the temperature was increased to 150° C.-155° C. and was maintained at 150° C.-155° C. for 15 minutes. 96.6 g of 37% formaldehyde solution was then charged to the reactor stream-wise over a period of 60 minutes, during which time the temperature dropped and reflux occurred. After all the formaldehyde was added, the mixture was held at reflux for 15 minutes. Then, 0.3 g of a 50% solution of sodium hydroxide was added. Water was then removed by atmospheric distillation to 145° C. Vacuum was applied and distillation continued to 160° C. When a temperature of 160° C. was reached, the vacuum was released and the resin was discharged from the flask.

Comparative Example 2. Aralkyl-Substituted Resorcinolic Novolac Resin 230.0 g of resorcinol was charged to a flask and heated to 120° C.-135° C. 0.7 g of p-toluene sulfonic acid was then added and mixed for 10 minutes. 111.0 g of styrene was then charged to the flask stream-wise over a period of about 120 minutes while the temperature was maintained at 120° C.-135° C. After all of the styrene was charged, the temperature was increased to 150° C.-155° C. and was maintained at 150° C.-155° C. for 15 minutes. 96.6 g of 37% formaldehyde solution was then charged to the reactor stream-wise over a period of 60 minutes, during which time the temperature dropped and reflux occurred. After all the formaldehyde was added, the mixture was held at reflux for 15 minutes. Then, 0.3 g of a 50% solution of sodium hydroxide was added. Water was then removed by atmospheric distillation to 145° C. Vacuum was applied and distillation continued to 160° C. When a temperature of 160° C. was reached, the vacuum was released and the resin was discharged from the flask.

Comparative Example 3. Resorcinolic Novolac Resin 230.0 g of resorcinol was charged to a flask and heated to 120° C.-135° C. 105.0 g of a 37% formaldehyde solution was then charged to the reactor stream-wise over a period of 60 minutes, during which time the temperature dropped and reflux occurred. After all the formaldehyde was added, the mixture was held at reflux for 15 minutes. Water was removed by atmospheric distillation to 145° C. Vacuum was applied and distillation continued to 160° C. When a temperature of 160° C. was reached, the vacuum was released and the resin was discharged from the flask.

Example 9. Aralkyl-Substituted Resorcinolic Novolac Resin 230.0 g of resorcinol was charged to a flask and heated to 120° C.-135° C. 0.7 g of p-toluene sulfonic acid was then added and mixed for 10 minutes. 19.5 g of styrene was then charged to the flask stream-wise over a period of about 15 minutes while the temperature was maintained at 120° C.-135° C. After all of the styrene was charged, the temperature was increased to 150° C.-155° C. and was maintained at 150° C.-155° C. for 15 minutes. 105.0 g of 37% formaldehyde solution was then charged to the reactor stream-wise over a period of 60 minutes, during which time the temperature dropped and reflux occurred. After all the formaldehyde was added, the mixture was held at reflux for 15 minutes. Then, 0.3 g of a 50% solution of sodium hydroxide was added. Water was then removed by atmospheric distillation to 145° C. Vacuum was applied and distillation continued to 160° C. When a temperature of 160° C. was reached, the vacuum was released and the resin was discharged from the flask.

Example 10. Aralkyl-Substituted Resorcinolic Novolac Resin 230.0 g of resorcinol was charged to a flask and heated to 120° C.-135° C. 0.7 g of p-toluene sulfonic acid was then added and mixed for 10 minutes. 30.5 g of styrene was then charged to the flask stream-wise over a period of about 30 minutes while the temperature was maintained at 120° C.-135° C. After all of the styrene was charged, the temperature was increased to 150° C.-155° C. and was maintained at 150° C.-155° C. for 15 minutes. 105.0 g of 37% formaldehyde solution was then charged to the reactor stream-wise over a period of 60 minutes, during which time the temperature dropped and reflux occurred. After all the formaldehyde was added, the mixture was held at reflux for 15 minutes. Then, 0.3 g of a 50% solution of sodium hydroxide was added. Water was then removed by atmospheric distillation to 145° C. Vacuum was applied and distillation continued to 160° C. When a temperature of 160° C. was reached, the vacuum was released and the resin was discharged from the flask.

Comparative Example 4. Aralkyl-Substituted Resorcinolic Novolac Resin 167.9 g of resorcinol was charged to a flask and heated to 120° C.-135° C. 0.5 g of p-toluene sulfonic acid was then added and mixed for 10 minutes. 79.4 g of styrene was then charged to the flask stream-wise over a period of about 100 minutes while the temperature was maintained at 120° C.-135° C. After all of the styrene was charged, the temperature was increased to 150° C.-155° C. and was maintained at 150° C.-155° C. for 15 minutes. 76.5 g of 37% formaldehyde solution was then charged to the reactor stream-wise over a period of 60 minutes, during which time the temperature dropped and reflux occurred. After all the formaldehyde was added, the mixture was held at reflux for 15 minutes. Then, 0.2 g of a 50% solution of sodium hydroxide was added. Water was then removed by atmospheric distillation to 145° C. Vacuum was applied and distillation continued to 160° C. When a temperature of 160° C. was reached, the vacuum was released and the resin was discharged from the flask.

Comparative Example 5. Resorcinolic Novolac Resin 230.0 g of resorcinol was charged to a flask and heated to 120° C.-135° C. 84.6 g of 37% formaldehyde solution was then charged to the reactor stream-wise over a period of 60 minutes, during which time the temperature dropped and reflux occurred. After all the formaldehyde was added, the mixture was held at reflux for 15 minutes. Water was removed by atmospheric distillation to 145° C. Vacuum was applied and distillation continued to 160° C. When a temperature of 160° C. was reached, the vacuum was released and the resin was discharged from the flask.

Example 11. Aralkyl-Substituted Resorcinolic Novolac Resin 230.0 g of resorcinol was charged to a flask and heated to 120° C.-135° C. 0.7 g of p-toluene sulfonic acid was then added and mixed for 10 minutes. 11.0 g of styrene was then charged to the flask stream-wise over a period of about 15 minutes while the temperature was maintained at 120° C.-135° C. After all of the styrene was charged, the temperature was increased to 150° C.-155° C. and was maintained at 150° C.-155° C. for 15 minutes. 84.6 g of 37% formaldehyde solution was then charged to the reactor stream-wise over a period of 60 minutes, during which time the temperature dropped and reflux occurred. After all the formaldehyde was added, the mixture was held at reflux for 15 minutes. Then, 0.3 g of a 50% solution of sodium hydroxide was added. Water was then removed by atmospheric distillation to 145° C. Vacuum was applied and distillation continued to 160° C. When a temperature of 160° C. was reached, the vacuum was released and the resin was discharged from the flask.

Example 12. Aralkyl-Substituted Resorcinolic Novolac Resin 230.0 g of resorcinol was charged to a flask and heated to 120° C.-135° C. 0.7 g of p-toluene sulfonic acid was then added and mixed for 10 minutes. 30.5 g of styrene was then charged to the flask stream-wise over a period of about 30 minutes while the temperature was maintained at 120° C.-135° C. After all of the styrene was charged, the temperature was increased to 150° C.-155° C. and was maintained at 150° C.-155° C. for 15 minutes. 84.6 g of 37% formaldehyde solution was then charged to the reactor stream-wise over a period of 60 minutes, during which time the temperature dropped and reflux occurred. After all the formaldehyde was added, the mixture was held at reflux for 15 minutes. Then, 0.3 g of a 50% solution of sodium hydroxide was added. Water was then removed by atmospheric distillation to 145° C. Vacuum was applied and distillation continued to 160° C. When a temperature of 160° C. was reached, the vacuum was released and the resin was discharged from the flask.

Comparative Example 6. Resorcinolic Novolac Resin 167.9 g of resorcinol was charged to a flask and heated to 120° C.-135° C. 0.5 g of p-toluene sulfonic acid was then added and mixed for 10 minutes. 95.3 g of styrene was then charged to the flask stream-wise over a period of about 100 minutes while the temperature was maintained at 120° C.-135° C. After all of the styrene was charged, the temperature was increased to 150° C.-155° C. and was maintained at 150° C.-155° C. for 15 minutes. 62.0 g of 37% formaldehyde solution was then charged to the reactor stream-wise over a period of 60 minutes, during which time the temperature dropped and reflux occurred. After all the formaldehyde was added, the mixture was held at reflux for 15 minutes. Then, 0.2 g of a 50% solution of sodium hydroxide was added. Water was then removed by atmospheric distillation to 145° C. Vacuum was applied and distillation continued to 160° C. When a temperature of 160° C. was reached, the vacuum was released and the resin was discharged from the flask.

Preparation of Rubber Composition

Rubber compounds containing the aralkyl substituted resorcinolic novolac resins and the resorcinolic novolac resin described in the foregoing Examples were prepared according to the composition shown in Table 1.

TABLE 1

| Formulation (parts by weight) | |
|---|---|
| Natural Rubber | 100 |
| Carbon Black (HAF Black N326) | 55 |
| Zinc Oxide | 8 |
| Stearic Acid | 1 |
| N-(1,3-Dimethylbutyl)-N'-Phenyl-p-Phenylenediamine | 2 |
| Polymerized 1,2-Dihydro-2,2,4-Trimethylquinoline | 1 |
| Resin | 3 |
| Cobalt Salt (22% Co) | 0.45 |

TABLE 1-continued

| Formulation (parts by weight) | |
|---|---|
| Insoluble Sulfur (20% Oil) | 5 |
| N,N-Dicyclohexyl-2-Benzothiazole Sulfenamide | 1 |
| Methylene Donor (HMMM, 72% Active) | 2.78 |

Evaluation of Resin and Rubber Properties

Softening point of the resins was determined using the procedure described above.

Free resorcinol was determined by liquid chromatography.

$^1$H-NMR was used to determine the mole % of resorcinolic aromatic rings that were aralkylated.

Brittleness was measured with a Tyler Ro-Tap Model B sieve shaker. A No. 8 mesh sieve (2.38 mm opening) was used. A 50 gram sample of prills of the novolac resin was placed in the sieve, which was then shaken for 30 minutes. The fractured particles/fines that ended up in the bottom pan were collected and weighed. The percentage of fractured particles/fines was calculated.

T'90 was measured with an Alpha Technologies MDR Rheometer (MDR2000) at 150° C., 0.5° arc and 1.67 Hz according to ASTM D-5289.

The rubber compounds were cured at 150° C., 10 tons pressure, according to parameters obtained from the MDR2000 rheometric test data. Tan δ, an indicator of compound hysteresis or heat build-up, was measured with a TA Instruments rheometer (ARES) at 5.0% torsional shear strain at 1 Hz and 60° C.

TABLE 2

| | Comp. Ex. 5 | Ex. 11 | Ex. 12 | Comp. Ex. 6 |
|---|---|---|---|---|
| Softening point, ° C. | 86.8 | 91.6 | 92.8 | 90.5 |
| Free Resorcinol, % | 25.5 | 19.5 | 16.0 | 3.4 |
| Molar F:R | 0.50 | 0.50 | 0.50 | 0.50 |
| % Aralkylation | 0 | 5 | 13 | 63 |
| Fines, % | 1.89 | 0.56 | 0.75 | 3.96 |
| T'90, min | 15.1 | 15.3 | 16.4 | 18.5 |
| Tan Delta, 60°, 5.0% strain | 0.236 | 0.236 | 0.233 | 0.238 |

TABLE 3

| | Comp. Ex. 1 | Ex. 1 | Ex. 2 | Ex. 3 | Ex. 4 | Ex. 5 | Ex. 6 | Ex. 7 | Ex. 8 | Comp. Ex. 2 |
|---|---|---|---|---|---|---|---|---|---|---|
| Softening point, ° C. | 101.0 | 106.6 | 105.5 | 106.9 | 105.3 | 105.0 | 108.8 | 105.2 | 102.4 | 101.1 |
| Free Resorcinol, % | 22.5 | 16.0 | 16.0 | 15.0 | 14.0 | 12.5 | 11.5 | 10.0 | 5.0 | 1.3 |
| Molar F:R | 0.57 | 0.57 | 0.57 | 0.57 | 0.57 | 0.57 | 0.57 | 0.57 | 0.57 | 0.57 |
| Aralkylation, % | 0 | 1 | 4 | 6 | 8 | 10 | 13 | 20 | 41 | 73 |
| Fines, % | 1.54 | 0.57 | 0.32 | 0.25 | 0.48 | 0.48 | 0.70 | 2.33 | 3.56 | 4.29 |
| T'90, min | 16.4 | 15.8 | 16.2 | 15.0 | 16.3 | 16.6 | 16.3 | 17.2 | 18.4 | 20.2 |
| Tan Delta, 60°, 5.0% strain | 0.231 | 0.239 | 0.229 | 0.224 | 0.228 | 0.228 | 0.235 | 0.226 | 0.228 | 0.230 |

TABLE 4

| | Comp. Ex. 3 | Ex. 9 | Ex. 10 | Comp. Ex. 4 |
|---|---|---|---|---|
| Softening point, ° C. | 111.7 | 119.0 | 119.6 | 114.9 |
| Free Resorcinol, % | 17.0 | 11.0 | 8.9 | 2.0 |
| Molar F:R | 0.62 | 0.62 | 0.62 | 0.62 |
| % Aralkylation | 0 | 9 | 13 | 54 |
| Fines, % | 1.35 | 0.74 | 0.97 | 3.56 |
| T'90, min | 14.6 | 15.3 | 15.5 | 17.9 |
| Tan Delta, 60°, 5.0% strain | 0.237 | 0.223 | 0.226 | 0.246 |

Although the invention has been described with some detail, it is to be understood that the scope of the invention is defined by what is hereafter claimed.

What is claimed is:

1. A pastille or prill comprising a resorcinolic novolac resin composition including:

(i) a resin including units defined by the formula (I)

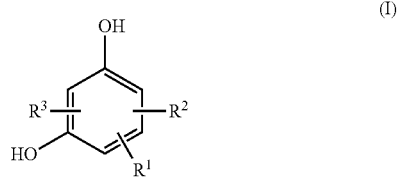

where $R^1$ is a hydrogen atom or an aralkyl group, at least one of $R^2$ and $R^3$ is an alkylene bridge, and the other of $R^2$ and $R^3$ is an alkylene bridge or a hydrogen atom; and (ii) unreacted resorcinolic compounds defined by the formula (II)

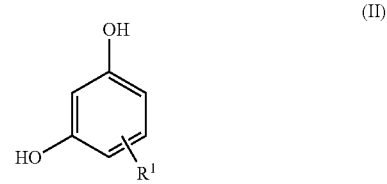

where $R^1$ is a hydrogen atom or an aralkyl group, and where 1 mole % to 10 mole % of the total resorcinolic aromatic rings in formula (I) and formula (II) have been aralkylated, and wherein the composition has an aldehyde to resorcinol molar ratio of from about 0.50:1 to about 0.62:1, and wherein the pastille or prill only exhibits up to 0.56 weight % fines when tested for brittleness as measured with a Tyler Ro-Tap Model B sieve shaker.

2. The pastille or prill of claim 1, where the aralkyl groups are styryl groups.

3. The pastille or prill of claim 1, where the alkylene bridge is a methylene bridge.

4. A method for forming a pastille or prill comprising an aralkyl-substituted resorcinolic novolac resin, the method comprising:

reacting (i) an aldehyde or ketone with (ii) an aralkyl-substituted resorcinol and resorcinol, in the presence of a catalyst of toluene sulfonic acid, where the moles of the aralkyl-substituted resorcinol to the total moles of the resorcinol and aralkyl-substituted resorcinol is 0.01:1 to 0.1:1, to provide a solid resorcinolic novolac resin; and forming the solid resorcinolic novolac resin into the form of a pastille or prill, and wherein the pastille or prill only exhibits up to 0.56 weight % fines when tested for brittleness as measured with a Tyler Ro-Tap Model B sieve shaker.

5. The method of claim 4, where the moles of the aralkyl-substituted resorcinol to the total moles of the resorcinol and aralkyl-substituted resorcinol is 0.01:1 to 0.09:1.

6. The method of claim 4, where the aldehyde or ketone is selected from the group consisting of formaldehyde, methyl formcel, acetaldehyde, propionaldehyde, butyraldehyde, crotonaldehyde, cinnamaldehyde, benzaldehyde, furfural, acetone, and methyl ethyl ketone.

7. The method of claim 4, where the aldehyde or ketone is an aldehyde and the aldehyde is formaldehyde or methyl formcel.

8. The method of claim 4, where the aralkyl-substituted resorcinol is styryl resorcinol or methyl styryl resorcinol.

9. The method of claim 4, where the molar ratio of (i) the aldehyde or ketone to (ii) the aralkyl-substituted resorcinol and resorcinol is from about 0.5:1 to 1:1.

10. An improved rubber composition comprising (1) per 100 parts diene rubber component selected from natural rubber, synthetic rubber or combinations thereof, and (2) 0.1 to 10 parts aralkyl-substituted resorcinolic novolac resin having from 1 mole % to about 10 mole % of the resorcinol aralkylated with one or more compounds selected from the group consisting of styrene, alpha-methyl styrene, beta-methyl styrene and p-methyl styrene, wherein the resin is disposed in the natural rubber in the form of pastilles or prills, and wherein the pastilles or prills only exhibit up to 0.56 weight % fines when tested for brittleness as measured with a Tyler Ro-Tap Model B sieve shaker.

11. The rubber composition of claim 10, wherein the resorcinol is aralkylated with styrene.

12. The rubber composition of claim 10, wherein the rubber composition further comprises 0.1 to 10 parts methylene donor based on 100 parts diene rubber component.

13. The composition of claim 10, wherein the synthetic rubber is selected from the group consisting of styrene-butadiene rubber, butadiene rubber, isoprene rubber, acrylonitrile-butadiene rubber, chloroprene rubber, isobutylene-isoprene rubber, ethylene propylene copolymer and ethylene propylene diene rubber.

14. The composition of claim 10, wherein the diene rubber is natural rubber.

15. The composition of claim 10, further comprising a methylene donor selected from the group consisting of hexamethylenetetramine, methylol melamine, etherified methylol melamines and esterified methylol melamines.

* * * * *